United States Patent
Xu et al.

(10) Patent No.: US 10,404,989 B2
(45) Date of Patent: Sep. 3, 2019

(54) HYBRID PREDICTION MODES FOR VIDEO CODING

(71) Applicant: GOOGLE LLC., Mountain View, CA (US)

(72) Inventors: Yaowu Xu, Saratoga, CA (US); Paul Wilkins, Cambridge (GB)

(73) Assignee: GOOGLE LLC, Mountain View, CA (US)

( * ) Notice: Subject to any disclaimer, the term of this patent is extended or adjusted under 35 U.S.C. 154(b) by 399 days.

(21) Appl. No.: 15/138,397

(22) Filed: Apr. 26, 2016

(65) Prior Publication Data

US 2017/0310973 A1   Oct. 26, 2017

(51) Int. Cl.
| | |
|---|---|
| *H04N 19/159* | (2014.01) |
| *H04N 19/176* | (2014.01) |
| *H04N 19/119* | (2014.01) |
| *H04N 19/147* | (2014.01) |
| *H04N 19/593* | (2014.01) |
| *H04N 19/107* | (2014.01) |
| *H04N 19/182* | (2014.01) |

(52) U.S. Cl.
CPC ......... *H04N 19/159* (2014.11); *H04N 19/107* (2014.11); *H04N 19/119* (2014.11); *H04N 19/147* (2014.11); *H04N 19/176* (2014.11); *H04N 19/182* (2014.11); *H04N 19/593* (2014.11)

(58) Field of Classification Search
None
See application file for complete search history.

(56) References Cited

U.S. PATENT DOCUMENTS

| | | | |
|---|---|---|---|
| 5,260,783 | A | 11/1993 | Dixit |
| 5,576,766 | A | 11/1996 | Matsumoto et al. |
| 7,302,006 | B2 | 11/2007 | Apostolopoulos et al. |
| 8,054,887 | B2 | 11/2011 | Keesen |

(Continued)

FOREIGN PATENT DOCUMENTS

| | | | |
|---|---|---|---|
| CN | 101877785 A | 11/2010 | |
| EP | 1351510 A1 * | 10/2003 | ........... H04N 19/176 |

(Continued)

OTHER PUBLICATIONS

Combined Search and Examination Report in corresponding foreign Application No. GB1621882.8, dated May 26, 2017.

(Continued)

*Primary Examiner* — Dave Czekaj
*Assistant Examiner* — Shanika M Brumfield
(74) *Attorney, Agent, or Firm* — Young Basile Hanlon & MacFarlane, P.C.

(57) ABSTRACT

A prediction block is determined for a current block of a current frame of a video stream using a template having pixel locations that conform to a subset of the pixel locations of the current block. A first portion of the prediction block having the same pattern of pixel locations as the template is populated by inter-predicted pixel values, and the remaining portion of the prediction block is populated by intra-predicted pixel values. The intra-predicted pixel values may be determined using inter-predicted pixel values of the first portion, pixel values of pixels adjacent to the current block, or both.

20 Claims, 10 Drawing Sheets

(56) References Cited

U.S. PATENT DOCUMENTS

| | | | | |
|---|---|---|---|---|
| 8,879,626 | B2* | 11/2014 | Alshina | H04N 19/13 375/240.12 |
| 9,036,944 | B2 | 5/2015 | Yie et al. | |
| 2006/0153297 | A1* | 7/2006 | Boyce | H04N 19/105 375/240.16 |
| 2007/0047648 | A1* | 3/2007 | Tourapis | H04N 19/176 375/240.13 |
| 2007/0098067 | A1* | 5/2007 | Kim | H04N 19/176 375/240.08 |
| 2010/0177821 | A1* | 7/2010 | Kadoto | H04N 19/105 375/240.12 |
| 2013/0051467 | A1 | 2/2013 | Zhou et al. | |
| 2014/0205008 | A1* | 7/2014 | Wu | H04N 19/593 375/240.12 |
| 2015/0016525 | A1 | 1/2015 | Alshina et al. | |

FOREIGN PATENT DOCUMENTS

| | | | | |
|---|---|---|---|---|
| EP | 1351510 | A1 * | 10/2003 | H04N 19/176 |
| EP | 2056606 | A1 * | 5/2009 | H04N 19/70 |
| EP | 2056606 | A1 * | 5/2009 | H04N 19/70 |
| EP | 2400763 | A2 * | 12/2011 | H04N 19/176 |
| EP | 2400763 | A2 * | 12/2011 | H04N 19/176 |

OTHER PUBLICATIONS

Bankoski, et al., "Technical Overview of VP8, An Open Source Video Codec for the Web", Jul. 11, 2011, 6 pp.

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and ecoding Guide, WebM Project", Google On2, Dec. 1, 2010, 103 pp.

* cited by examiner

| M | A | B | C | D | E | F | G | H |
|---|---|---|---|---|---|---|---|---|
| I | a | b | c | d | | | | |
| J | e | f | g | h | | | | |
| K | i | j | k | l | | | | |
| L | m | n | o | p | | | | |

HYBRID PREDICTION MODES FOR VIDEO CODING

BACKGROUND

Digital video streams typically represent video using a sequence of frames or still images. Each frame can include a number of blocks, which in turn may contain information describing the value of color, brightness or other attributes for pixels. The amount of data in a typical video stream is large, and transmission and storage of video can use significant computing or communications resources. Due to the large amount of data involved in video data, high performance compression is needed for transmission and storage. This often involves inter-prediction using motion vectors, intra-prediction using pixels of the current frame, or both.

SUMMARY

This disclosure relates in general to encoding and decoding visual data, such as video stream data, using combined inter and intra-prediction.

A method for encoding or decoding a video signal according to one aspect of this disclosure, where the video signal includes frames defining a video sequence, each frame has blocks, and each block has pixels, includes determining a template for prediction of a current block, determining inter-predicted pixels for a first portion of a prediction block, determining intra-predicted pixel values for a second portion of the prediction block that is non-overlapping with the first portion of the prediction block, and encoding or decoding the current block using the prediction block. The template has dimensions conforming to a proper subset of pixels of the current block, and the first portion has the dimensions of the template.

Another method of encoding or decoding described herein includes determining a prediction block of pixel values for a current block in a current frame using intra-prediction of pixel values from a first reference frame, and encoding or decoding the current block using the prediction block. The pixel values from the first reference frame are determined using inter-prediction based on a template with pixel positions that are a proper subset of dimensions of the current block.

One aspect of an apparatus described herein is an apparatus for encoding or decoding a video signal, the video signal including frames defining a video sequence, each frame having blocks, and each block having pixels. The apparatus comprises a processor and a non-transitory memory that stores includes instructions causing the processor to perform a method including determining a first portion of pixel values of a prediction block for a current block using inter-prediction and a template having dimensions conforming to a proper subset of pixels of the current block such that the first portion has the dimensions, determining a second portion of pixel values of the prediction block using intra-prediction, and encoding or decoding the current block using the prediction block.

These and other aspects of this disclosure, including variations, are described in additional detail in the following detailed description, the appended claims, and the accompanying figures.

BRIEF DESCRIPTION OF THE DRAWINGS

The description herein makes reference to the accompanying drawings described below wherein like reference numerals refer to like parts throughout the several views.

FIG. 8 is a diagram of a 4×4 block used to illustrate various intra-prediction modes.

FIGS. 9A-9H are diagrams showing examples of intra-prediction modes for the block of FIG. 8.

DETAILED DESCRIPTION

A video stream may be compressed by a variety of techniques to reduce bandwidth required transmit or store the video stream. A video stream can be encoded into a bitstream, which can involve compression, and then be transmitted to a decoder that can decode or decompress the video stream to prepare it for viewing or further processing. Encoding a video stream using compression involves parameters that make trade-offs between video quality and bitstream size, where increasing the perceived quality of a decoded video stream can increase the number of bits required to transmit or store the bitstream.

One technique to achieve superior compression performance exploits spatial and temporal correlation of video signals through spatial and/or motion compensated prediction. Inter-prediction, for example, uses a motion vector to identify a previously encoded and decoded block that resembles a current block to be encoded. By encoding the motion vector, and the difference between the two blocks, a decoder can re-create the current block. Intra-prediction, on the other hand, can predict a current block using information from the same frame and encode the difference between the two blocks to be decoded to recreate the current block. Encoders can encode the blocks of a frame using two or more of a plurality of inter- and intra-prediction modes and measure the rate/distortion of each mode for each block to select the prediction mode having the least distortion, as measured by calculating a sum of absolute differences (SAD), for the resulting rate, as measured by the number of bits in the encoded bitstream, for example.

The teachings herein describe the use of combined inter- and intra-prediction within a block. Inter-prediction can be used according to a template. The template can be used, along with one or more motion vectors, to form a portion of a prediction block with pixels of one or more reference frames (e.g., frames temporally close to the current frame in the video stream). This portion of the prediction block and/or pixels adjacent to the current block can then be used to intra-predict the remaining portion of the prediction block. The prediction block may be used to form a residual that is transmitted along with bits representing the template, motion vector(s), and the intra-prediction mode to be decoded by a decoder. Blocks encoded using combined inter- and intra-prediction as described herein can have improved rate/distortion measures over blocks encoded using either technique alone. Details are explained in more detail below after description of an environment in which the teachings herein may be implemented.

Figure 1:
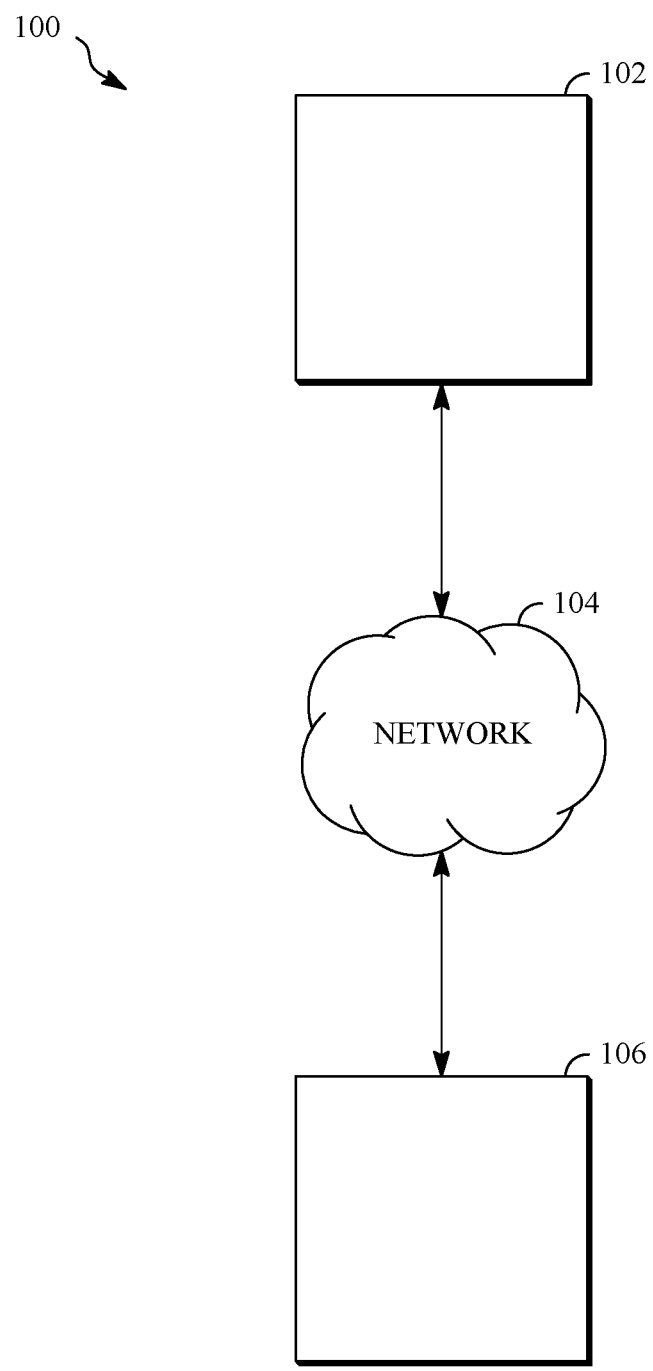
FIG. 1 is a schematic of a video encoding and decoding system.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
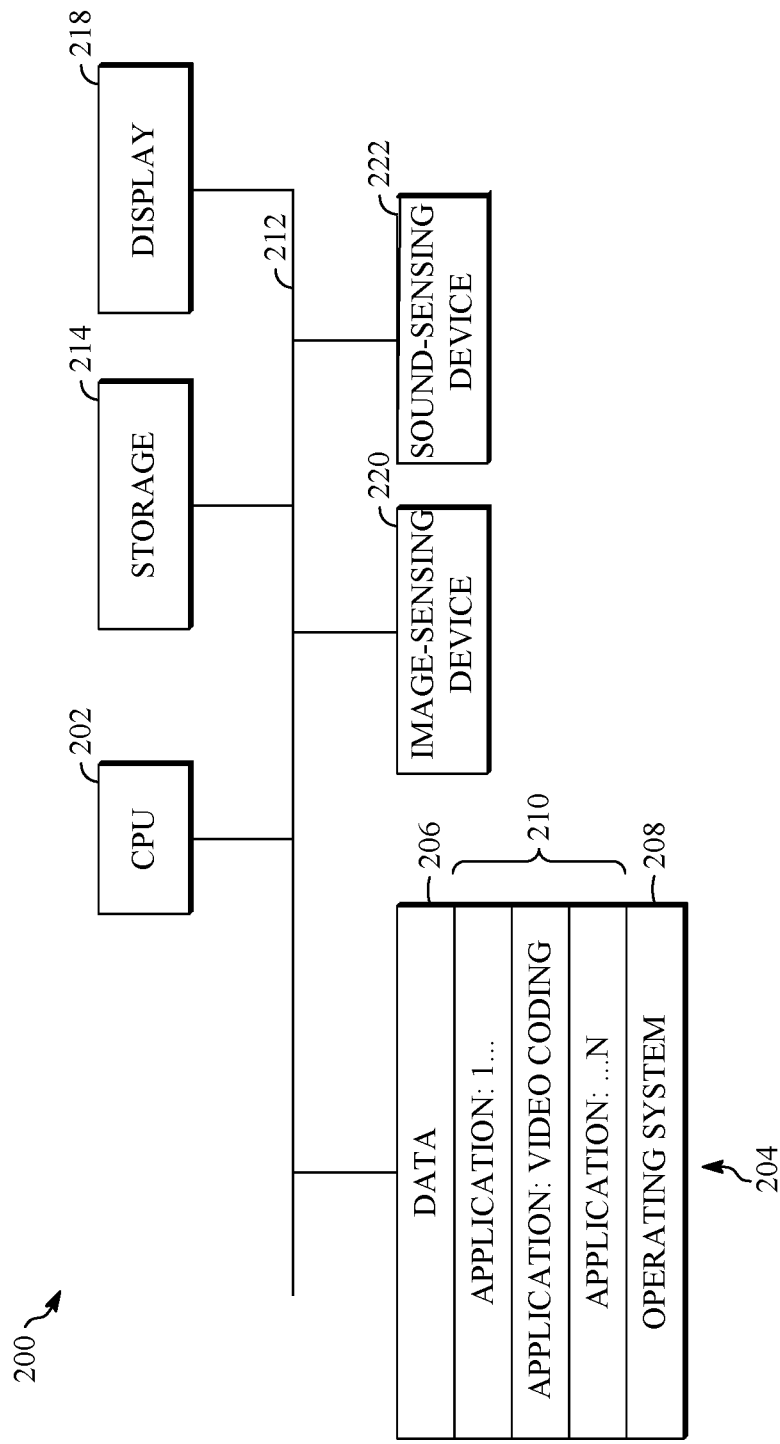
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used, e.g., a Hypertext-Transfer Protocol (HTTP)-based video streaming protocol.

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a conventional central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more of processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
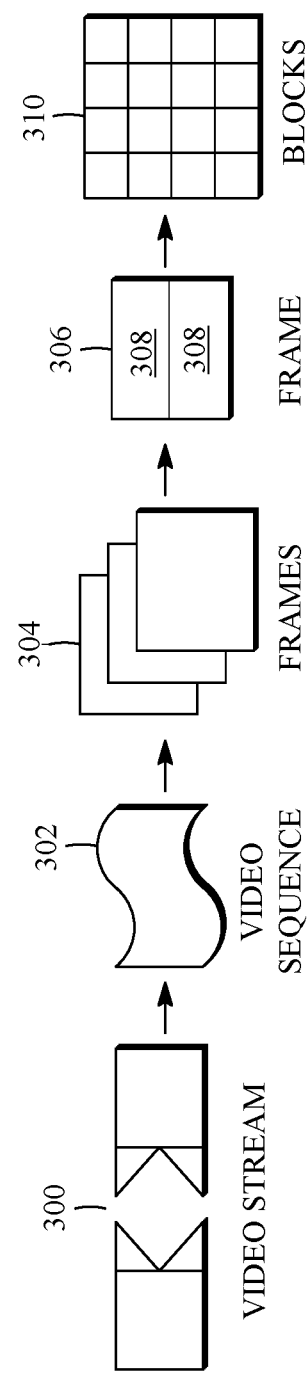
FIG. 3 is a diagram of a typical video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 may be sampled at different resolutions.

Whether or not the frame 306 is divided into the segments 308, the frame 306 may be further subdivided into blocks 310, which can contain data corresponding to, for example, 16×16 pixels in frame 306. The blocks 310 can also be arranged to include data from one or more planes of pixel data. The blocks 310 can also be of any other suitable size such as 4×4 pixels, 8×8 pixels, 16×8 pixels, 8×16 pixels, 16×16 pixels or larger. Unless otherwise noted, the terms block and macroblock are used interchangeably herein. The frame 306 may be partitioned according to the teachings herein as discussed in more detail below.

Figure 4:
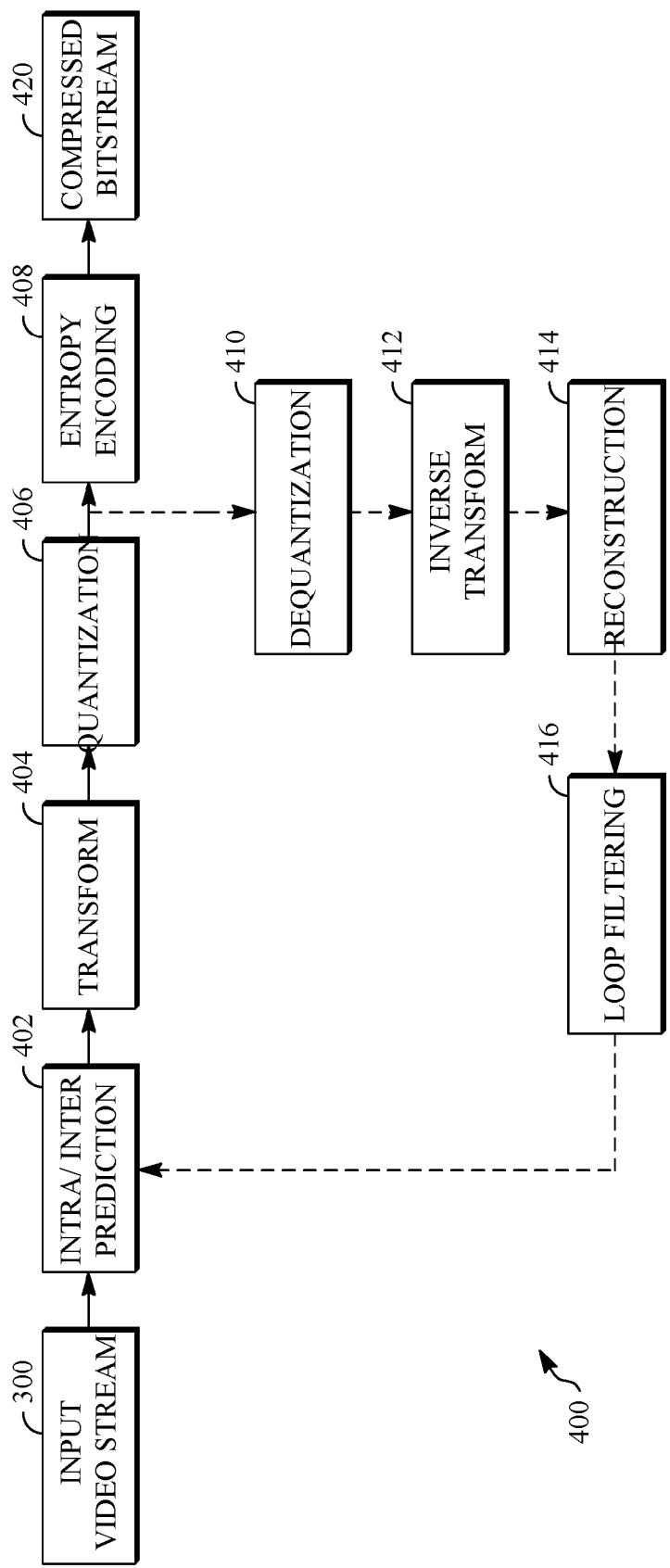
FIG. 4 is a block diagram of an encoder according to an aspect of the teachings herein.

FIG. 4 is a block diagram of an encoder 400 in accordance with an implementation. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described in FIG. 4 and in FIG. 6, below. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter-prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of blocks. At the intra/inter-prediction stage 402, a block can be encoded using intra-frame prediction (also called intra-prediction) or inter-frame prediction (also called inter-prediction), or a combination both as described with regard to FIG. 6. In any case, a prediction block can be formed. In the case of intra-prediction, all or a part of a prediction block may be formed from samples in the current frame that have been previously encoded and reconstructed. In the case of inter-prediction, all or part of a prediction block may be formed from samples in one or more previously constructed reference frames.

Next, still referring to FIG. 4, the prediction block can be subtracted from the current block at the intra/inter-prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms are possible. Further, combinations of different transforms may be applied to a single residual. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. It is worth noting that the size of a prediction block, and hence the resulting residual block, may be different from the size of the transform block. For example, the prediction block may be split into smaller blocks to which separate transforms are applied.

The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. Entropy coding may be performed using any number of techniques, including token and binary trees. The entropy-encoded coefficients, together with other information used to decode the block, which may include for example the type of prediction used, transform type, motion vectors and quantizer value, are then output to the compressed bitstream 420. The information needed to decode the block may be entropy coded into block, frame, slice and/or section headers within the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter-prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames.

In another implementation, an encoder 400 can have the quantization stage 406 and the dequantization stage 410 combined into a single stage.

Figure 5:
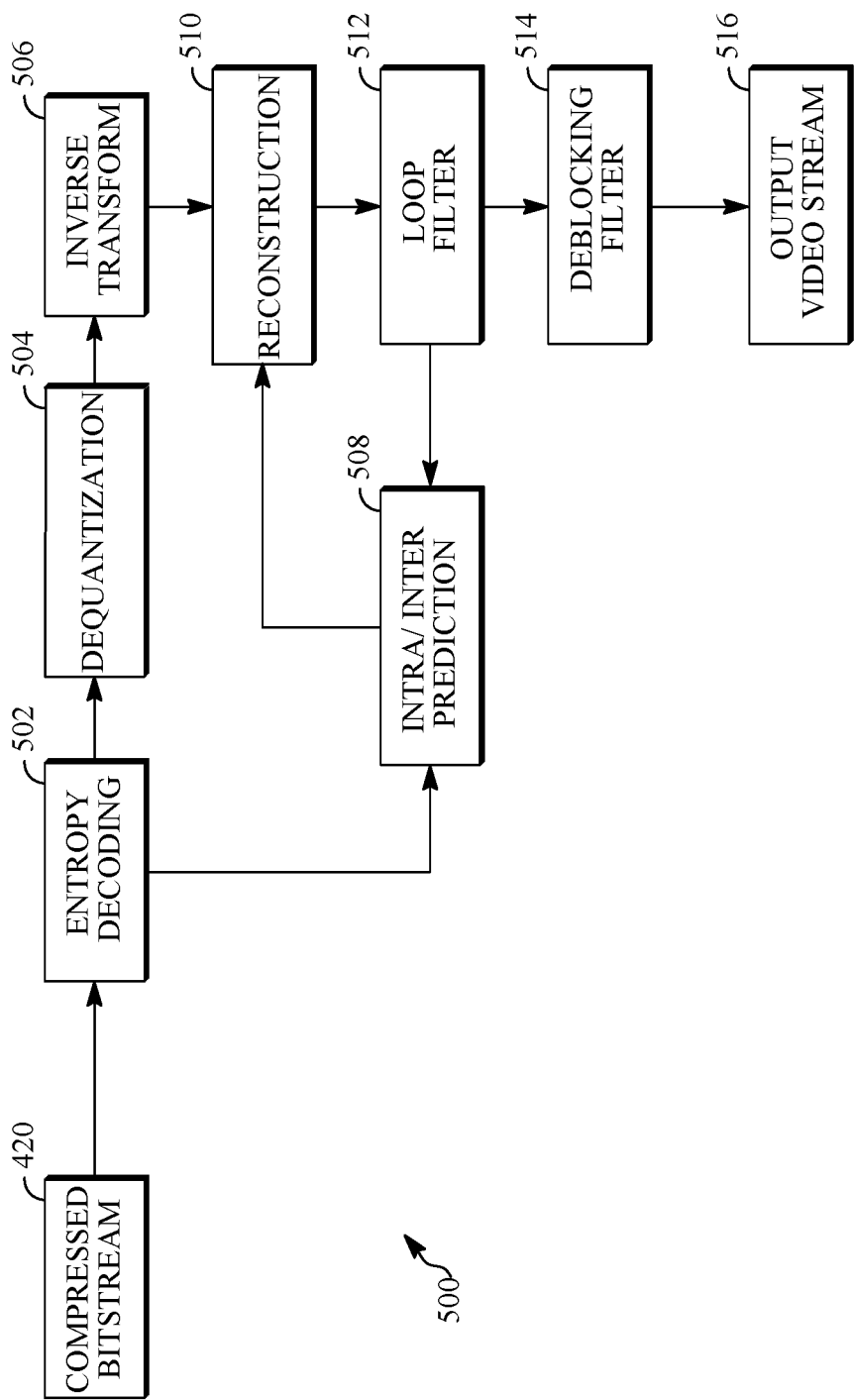
FIG. 5 is a block diagram of a decoder according to an aspect of the teachings herein.

FIG. 5 is a block diagram of a decoder 500 in accordance with another implementation. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 5 and in FIG. 6 below. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter-prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter-prediction stage 508 to create the same prediction block as was created in the encoder 400, e.g., at the intra/inter-prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering stage 514 is applied to the reconstructed block to reduce blocking distortion, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the deblocking filtering stage 514.

As mentioned briefly above, a block may be encoded or decoded by motion vector prediction using pixels from a reference frame or using pixels from nearby blocks to generate a prediction block. In some cases, combining the two techniques may better match objects within an image, improving video compression.

Figure 6:
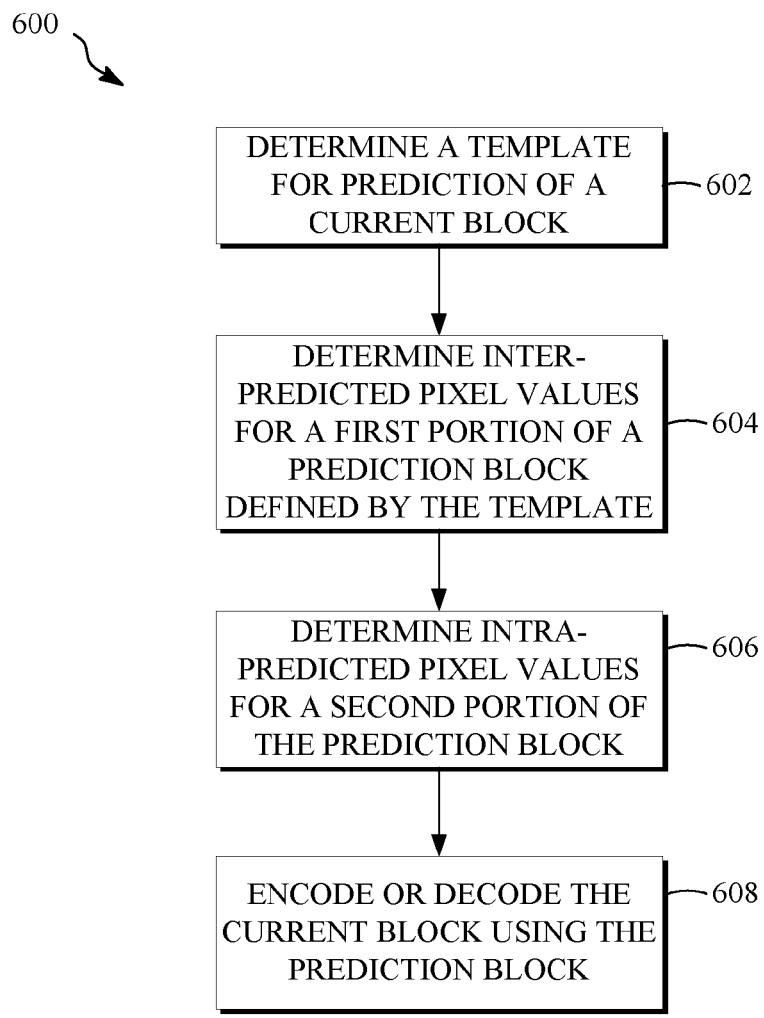
FIG. 6 is a flowchart diagram of a process for encoding or decoding a block by combined intra and inter-prediction according to one aspect of the teachings herein.

FIG. 6 is a flowchart diagram of a process 600 for encoding or decoding a block by combined inter- and intra-prediction according to one implementation of this disclosure. The method or process 600 can be implemented in a system such as the computing device 200 to aid the encoding or decoding of a video stream. The process 600 can be implemented, for example, as a software program that is executed by a computing device such as the transmitting station 102 or the receiving station 106. The software program can include machine-readable instructions that are stored in a memory such as the memory 204 that, when executed by a processor such as the CPU 202, cause the computing device to perform the process 600. The process 600 can also be implemented using hardware in whole or in part. As explained above, some computing devices may have multiple memories and multiple processors, and the steps or operations of the process 600 may in such cases be distributed using different processors and memories. Use of the terms "processor" and "memory" in the singular herein encompasses computing devices that have only one processor or one memory as well as devices having multiple processors or memories that may each be used in the performance of some but not necessarily all recited steps.

For simplicity of explanation, the process 600 is depicted and described as a series of steps or operations. However, steps and operations in accordance with this disclosure can occur in various orders and/or concurrently. Additionally, steps or operations in accordance with this disclosure may occur with other steps or operations not presented and described herein. Furthermore, not all illustrated steps or operations may be required to implement a method in accordance with the disclosed subject matter. The process 600 may be repeated for each block and each frame of the input signal.

When the process 600 is an encoding process, the input signal can be, for example, the video stream 300. The input signal can be received by the computing device 200 performing the process 600 in any number of ways. For example, the input signal can be captured by the image-sensing device 220 or received from another device through an input connected to the bus 212. The input signal could be retrieved from the secondary storage 214 in another implementation. Other ways of receiving and other sources of the input signal are possible. For example, when the process 600 is a decoding process, the input signal can be an encoded bitstream such as the compressed bitstream 420.

Video compression schemes can first divide an image frame into large blocks. An encoder may recursively break large blocks down into smaller blocks. These recursive relationships between blocks can be represented by one or more tree structures. For each block that represents a leaf node on the tree structure, the encoder may select intra or inter-prediction, or a combination of both to produce a prediction block.

At 602, a template is determined for prediction of a current block. By determine we mean to select, calculate, find, restore, read or in any manner whatsoever determine. The template has dimensions conforming to a proper subset of pixels of the current block. A proper subset is a mathematical term meaning that the subset does not include all of the elements of the set. In other words, the template has fewer pixel positions than the current block to be encoded. The template may be one of a plurality of templates associated with the current block dimensions (e.g., rectangular blocks such as 4×4, 8×8, 16×8, 8×16, 32×32, etc.) Each block size may be associated with respective templates.

Desirably, but not necessarily, each of the plurality of templates available for a block size has at least one column and at least one row. One or more of the columns may have a number of pixel locations equal to a first dimension of the current block, and one or more rows may have a number of pixel locations equal to a second dimension of the current block. In some cases, the columns and rows have a common originating pixel location (e.g., a corner). This can be seen by reference to FIGS. 7A-7B, which are diagrams showing embodiments of a template according to the teachings herein.

Figure 7A:
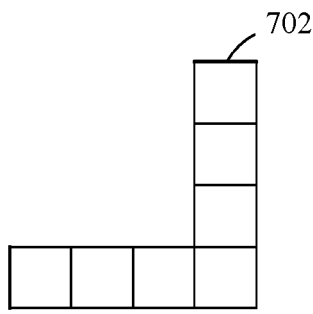
FIGS. 7A-7C are diagrams showing embodiments of a template according to the teachings herein.
Figure 7B:
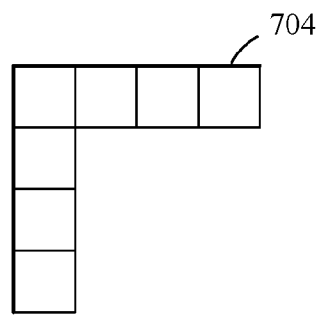
Figure 7C:
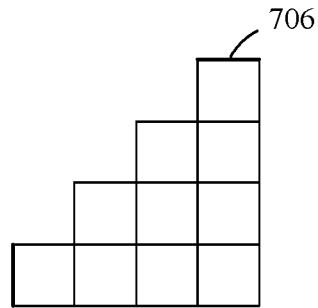

More specifically, each of FIGS. 7A-7C is a respective template 702, 704, 706 that may be used for prediction of a 4×4 block. Each square in a template 702, 704, 706 represents a single pixel. Template 702 represents pixels along the lower right-hand edges of a 4×4 block, template 704 represents pixels along the upper left-hand edges of a 4×4 block, and template 706 represents pixels in the lower right-hand corner of a 4×4 block in a staircase form. In each of these examples, the dimensions comprise at least two different dimensions for each of a length and a width such that the template 702, 704, 706 is other than a rectangular shape. Other templates are possible for a 4×4 block, and other templates would be available for different size blocks to be encoded. While the pixel locations should desirably but not necessarily be contiguous within a template, the shape can vary from those shown such that different sizes have different shapes.

When the process 600 is an encoding process, determining the template can include selecting each template in turn and using it in a rate/distortion loop to determine which template results in the lowest rate/distortion measure for encoding the portion of the current block inter-predicted using the template as described below. In another implementation, the pixels determined by each template are used with pixels generated by various intra-prediction modes as described herein, and the combinations of different templates and different intra-prediction modes are compared in a rate/distortion loop to determine which combination of template and intra-prediction mode results in the lowest rate/distortion measure for encoding the current block as a whole. When only one template is available, such techniques are not necessary, and other techniques for determining the template when multiple templates are available may be used.

When the process 600 is a decoding process, the template may be determined at 602 by decoding header information. For example, each template may be assigned an index or identifier that is commonly known by an encoder and a decoder. Then, the encoder may encode the index or identifier of the template it determines at 602 for transmission to a decoder so that the decoder can determine the template at 602 using the index or identifier.

After the template is determined at 604, it is used to determine inter-predicted pixel values for a first portion of a prediction block. The first portion has the dimensions of the template. Determining the inter-predicted values can include performing a first motion search within a reference frame for pixel values arranged as in the template that most closely match the pixel values of the corresponding pixels within the current block to be encoded. That is, a first motion vector that results in the best match for pixel values within the current block that conform to the shape of the template is found. The best matching pixel values fill in the first portion of the prediction block for the current block.

This example of determining inter-predicted pixel values finds the pixels that best match the pixels of the current block in a single reference frame (e.g., a last frame, a golden frame, or an alternative reference frame). Video encoding schemes can use multiple reference frames either before or after a current frame including the current block to be encoded for inter-prediction. For example, bi-directional prediction can find the best-fit pixels to the pixels of the current block in temporally adjacent frames both before and after the current frame in the video sequence and combine the values within the first portion of the prediction block (i.e., the portion that falls within the boundaries of the template. In this case, two motion vectors and two reference frames are used. In either case, each motion vector and an identifier or index for each reference frame may be encoded into the video bitstream for transmission to a decoder.

In a decoder, determining the inter-predicted pixel values at 604 may include using the motion vector(s) and reference frame(s) to select the pixel values from the reference frame to include in the first portion of the prediction block defined by the template.

After the inter-predicted pixel values are determined at 604, intra-predicted pixel values for a second portion of the prediction block are determined at 606. The second portion does not overlap the first portion and may encompass the entirety of the prediction block other than the first portion. The intra-predicted pixel values may be determined using an intra-prediction mode of a plurality of available intra-prediction modes. Hence, determining the intra-predicted pixel values at 606 may also include determining the intra-prediction mode of the available intra-prediction modes.

As mentioned briefly with reference to the determination of the template at 602, the intra-prediction mode may be selected by the encoder as part of a rate/distortion loop, either alone or in combination with the rate/distortion loop described above with respect to the determination of the template and the inter-predicted pixels. For example, various intra-prediction modes may be tested with each template or after the template is separately determined to find which type of prediction will have the lowest distortion for a given rate, or number of bits to be transmitted in an encoded video bitstream, including overhead bits included in the bitstream to indicate the type of prediction used. Distortion can be measured by calculating a measure of the residual block, which is the data remaining after subtracting the resulting prediction block from the current block to be encoded. One example of a measure of the residual block is a sum of absolute differences (SAD). SAD can be calculated by summing the absolute difference between the prediction block and the current block on a pixel-by-pixel basis. The smaller the SAD, the more accurately the prediction block predicts the current block to be encoded. When the intra-prediction mode is determined separately, only the rate/distortion measures associated with the second portion of the prediction block may be considered, instead of the complete prediction block.

Figures 8, 9A, 9B:
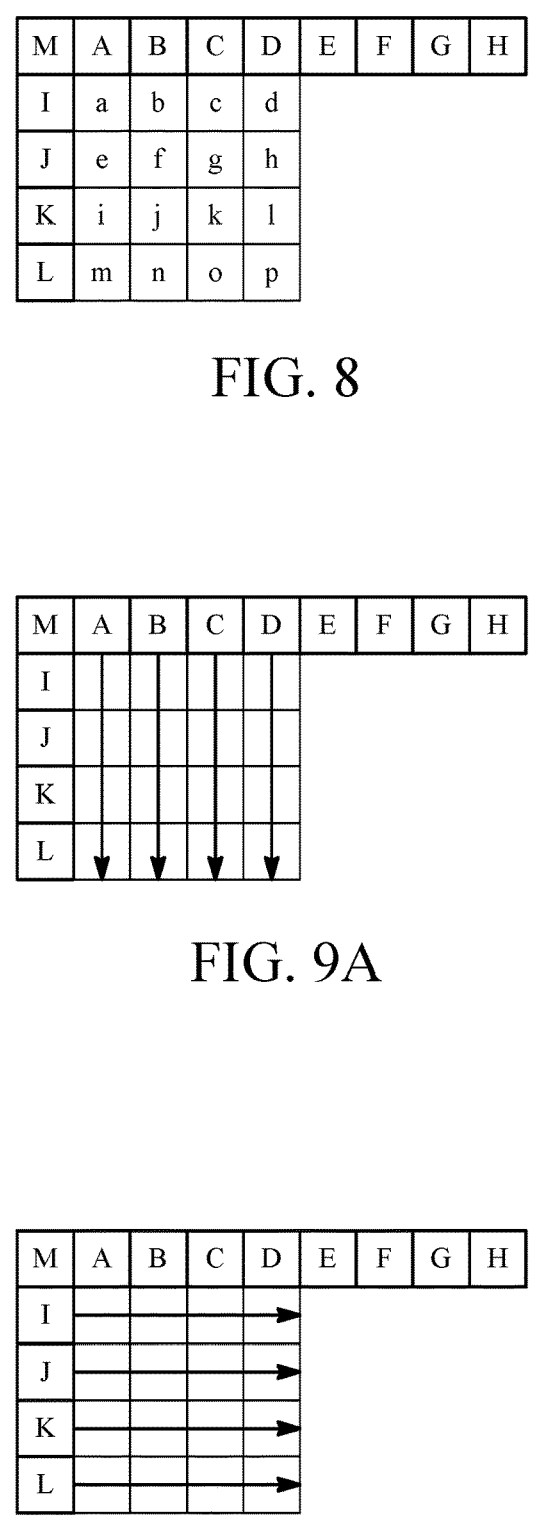

FIG. 8 is a diagram of a 4×4 block used to illustrate various intra-prediction modes. While FIG. 8 uses an example of a 4×4 block, techniques disclosed herein can be used with other block sizes. The 4×4 block in FIG. 8 is represented by pixels a-p, and its peripheral pixels are labeled A-M. In one implementation of the teachings herein, pixel values for pixels A-M can be used to predict pixel values for pixels a-p by extending the values of peripheral pixels A-M to a prediction block having the same size as the block to be predicted.

The pixels A-M, which occur on the top and left of a current block are used in the example of FIG. 8 because blocks of a frame are often encoded in raster scan order, from the upper left corner of the frame from left to right along rows descending from the top to the bottom of the frame. In this fashion, for a given block, the pixels A-M peripheral to the block will have been encoded and subsequently decoded prior to being used to predict the block such that the peripheral pixels will attain the same value in the encoder as will be encountered by a decoder. However, other pixels may be used as discussed below.

Figure 9C:
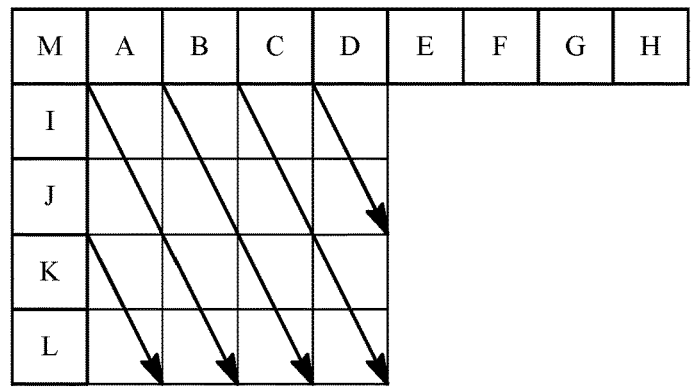

FIGS. 9A-9H are diagrams showing examples of intra-prediction modes for the block of FIG. 8. In FIG. 9A, an intra-prediction mode referred to generally as a vertical intra-prediction mode is shown. In this mode, prediction block pixels corresponding to the locations of pixels a, e, i and j of the block to be predicted are set to the value of peripheral pixel A, prediction block pixels corresponding to the locations of pixels b, f, j and n of the block to be predicted are set to the value of pixel B, prediction block pixels corresponding to the locations of pixels c, g, k and o of the block to be predicted are set to the value of pixel C, and prediction block pixels corresponding to the locations of pixels d, h, l and p of the block to be predicted are set to the value of pixel D. Alternative techniques for implementing the vertical intra-prediction mode may combine values of two or more peripheral pixels to calculate a pixel value to be used in the prediction block, such as by averaging the values of the peripheral pixels.

FIG. 9B shows a horizontal intra-prediction mode. In this example, pixel I is used to set the values of prediction block pixels corresponding to the locations of pixels a, b, c and d of the block to be predicted, pixel J is used to set the values of prediction block pixels corresponding to the locations of pixels e, f, g and h of the block to be predicted, pixel K is used to set the values of prediction block pixels corresponding to the locations of pixels i, j, k and l of the block to be predicted, and pixel L is used to set the values of prediction block pixels corresponding to the locations of pixels m, n, o and p of the block to be predicted. As in the above-described prediction mode, the peripheral pixels (e.g., their values) can be combined to set the prediction block pixel values instead of merely repeating the values of a single peripheral pixel across all pixel locations of the prediction block.

FIG. 9C shows an oblique intra-prediction mode or an oblique, diagonal intra-prediction mode where the direction of the arrows along which the peripheral pixels will be propagated to generate the prediction block form a diagonal at an angle of about 117° from the horizontal. In this example of a diagonal intra-prediction mode, the peripheral pixels or combinations of two or three peripheral pixels are propagated to form the prediction block in the direction of the arrows in FIG. 9C. For example, pixels in the prediction block corresponding to the locations of pixels i and m of the block to be predicted are set to a value formed from pixels J and K, and so forth.

Figure 9D:
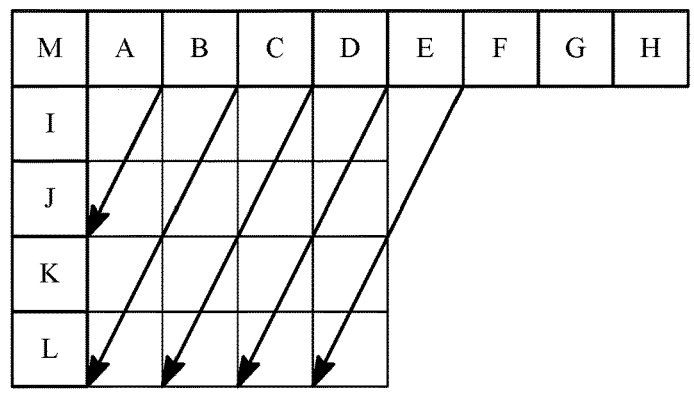

FIG. 9D shows another oblique, diagonal intra-prediction mode where the direction of the arrows along which the peripheral pixels are propagated to generate the prediction block form a diagonal at an angle of about 63° from the horizontal. In this example of a diagonal intra-prediction mode, the peripheral pixels or combinations of two or three peripheral pixels are propagated to form the prediction block in the direction of the arrows in FIG. 9D. For example, pixels in the prediction block corresponding to the locations of pixels a and e of the block to be predicted are set to a value formed from pixels A and B, and so forth.

Figure 9E:
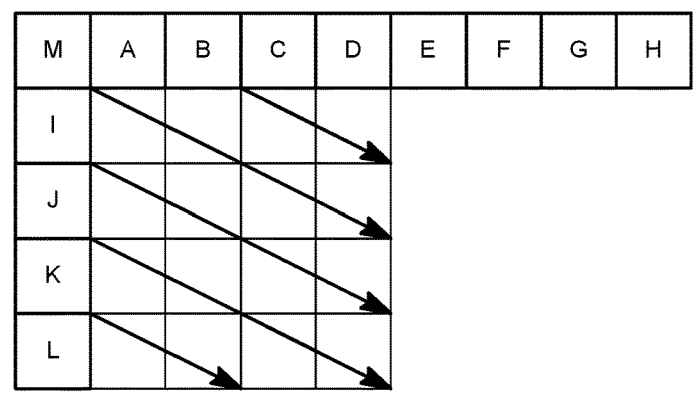

FIG. 9E shows another oblique, diagonal intra-prediction mode where the direction of the arrows along which the peripheral pixels are propagated to generate the prediction block form a diagonal at an angle of about 153° from the horizontal. In this example of a diagonal intra-prediction mode, the peripheral pixels or combinations of two or three peripheral pixels are propagated to form the prediction block in the direction of the arrows in FIG. 9E. For example, pixels in the prediction block corresponding to the locations of pixels c and d of the block to be predicted are set to a value formed from pixels B and C, and so forth.

Figure 9F:
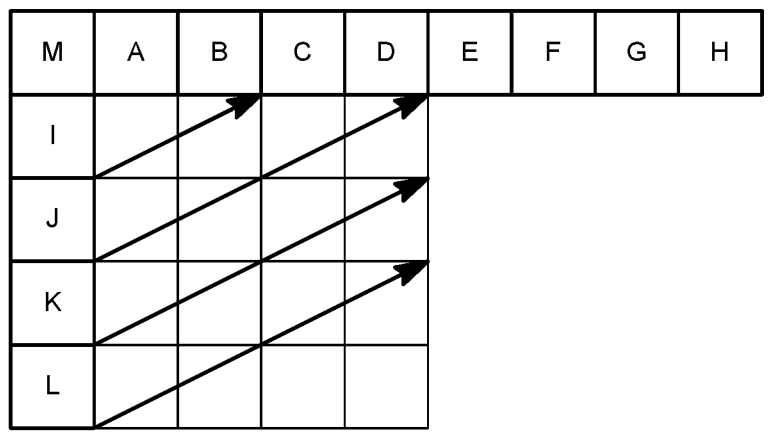

FIG. 9F shows another oblique, diagonal intra-prediction mode where the direction of the arrows along which the peripheral pixels are propagated to generate the prediction block form a diagonal at an angle of about 27° from the horizontal. In this example of a diagonal intra-prediction mode, the peripheral pixels or combinations of two or three peripheral pixels are propagated to form the prediction block in the direction of the arrows in FIG. 9F. For example, pixels in the prediction block corresponding to the locations of pixels a and b in the block to be predicted are set to a value formed from pixels I and J, and so forth.

Figure 9G:
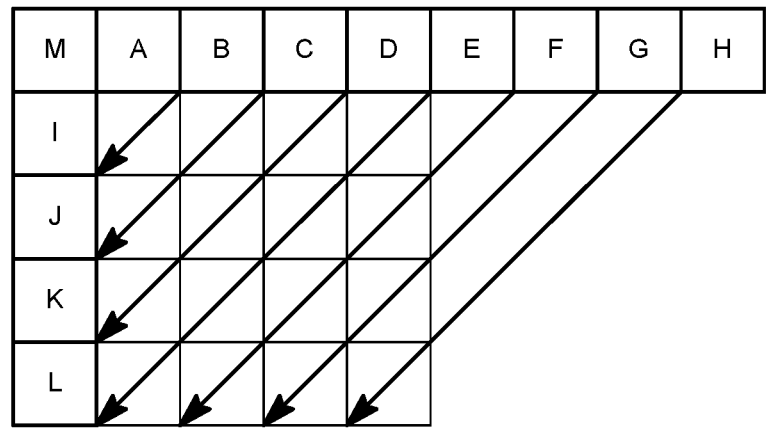

FIG. 9G shows another oblique, diagonal prediction mode where the direction of the arrows along which the peripheral pixels are propagated to generate the prediction block form a diagonal at an angle of about 135° from the horizontal. In this example of a diagonal intra-prediction mode, the peripheral pixels or combinations of two or three peripheral pixels are propagated to form the prediction block in the direction of the arrows in FIG. 9G. For example, pixels in the prediction block corresponding to the locations of pixels b and e in the block to be predicted are set to a value formed from pixels B and C, and so forth.

Figure 9H:
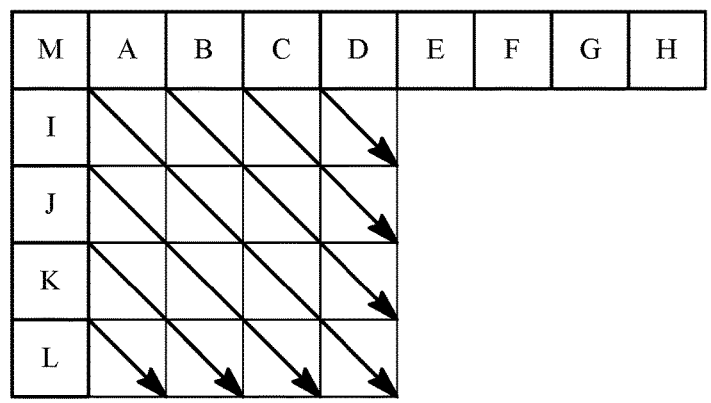

FIG. 9H shows another oblique, diagonal prediction mode where the direction of the arrows along which the peripheral pixels are propagated to generate the prediction block form a diagonal at an angle of about 45° from the horizontal. In this example of a diagonal intra-prediction mode, the peripheral pixels or combinations of two or three peripheral pixels are propagated to form the prediction block in the direction of the arrows in FIG. 9H. For example, pixels in the prediction block corresponding to the locations of pixels c and h in the block to be predicted are set to a value formed from pixels B and C, and so forth.

Other intra-prediction modes may form a single value from combinations of the peripheral pixels A-M and set prediction block pixels a-p to the single value. These modes, sometimes called DC prediction and TM prediction, form a single pixel value from combinations of subsets of the pixels A-M and propagate the single value throughout the prediction block and may be referred to as single-value intra-prediction modes herein.

Referring again to FIG. 6, the process 600 may transmit an identifier for the intra-prediction mode to a decoder by encoding it into the bitstream as described with respect to the index or identifier for the template. That is, an encoder and decoder could share a table or other device to link intra-prediction modes with an index or other identifier such that the encoder can identify the determined intra-prediction mode to the decoder for its reconstruction of the second portion of the prediction block. When the process 600 is implemented in a decoder, determining the intra-predicted pixel values at 606 may involve decoding the index or identifier of the intra-prediction mode received from the encoder so as to determine the intra-predicted pixel values.

Figure 10:
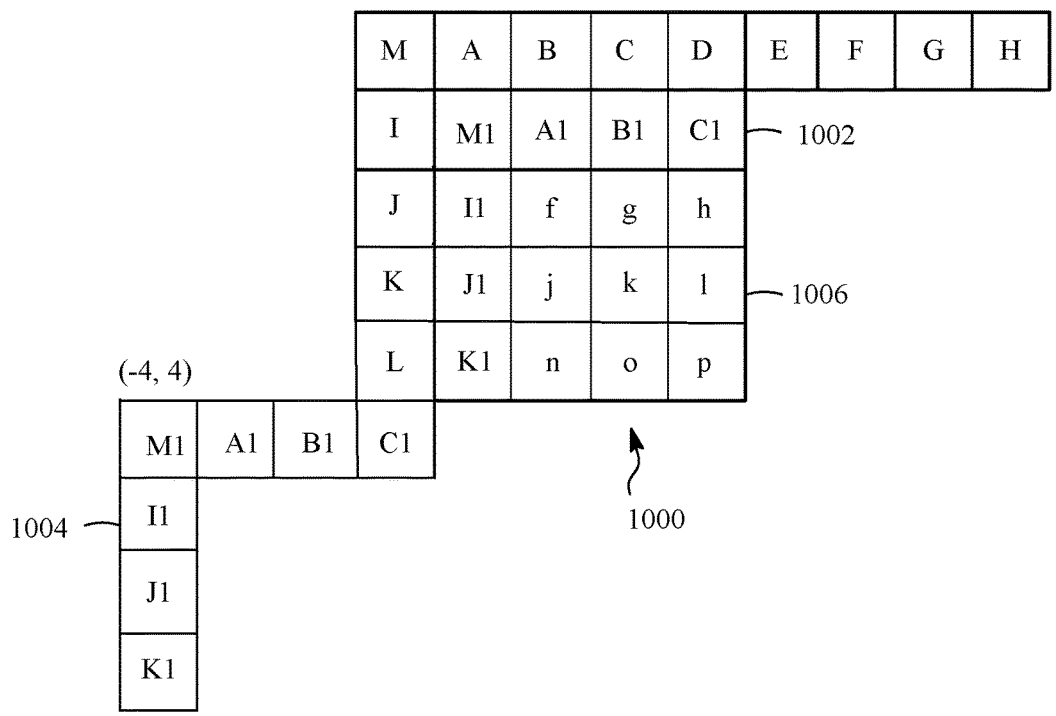
FIG. 10 is a diagram used to explain an example of the process of FIG. 6.

FIG. 10 is a diagram used to explain an example of the process of FIG. 6. In this example, a 4×4 prediction block 1000 is shown. The lettering system of FIG. 8 is used in this explanation. The reference frame is the last frame and the motion vector is (−4, 4), which points four pixels to the left and four pixels down in the last frame from the location of the current block in the current frame as represented by the location of the prediction block in FIG. 10. The inter-predicted pixel values A1, B1, C1, I1, J1, K1, M1 of the first portion 1002 are determined using the template 704 of FIG. 7B. More specifically, the first portion 1002 is filled by copying the template-shaped pixels 1004 from the location indicated by the motion vector in the last frame to the template-shaped first portion 1002. The intra-predicted pixel values f, g, h, j, k, l, n, o, p are determined for the remaining 3×3 second portion 1006 of the prediction block 1000 using an intra-prediction mode.

There are at least two techniques by which the second portion 1006 may be produced using intra-prediction according to the teachings herein. In a first technique, the peripheral pixels A-M, which occur on the top and left of a current block for which the prediction block 1000 is generated, or combinations these peripheral pixels are propagated in the directions indicated by one of the sets of arrows of FIGS. 9A-9H to fill in the missing pixel positions of the second portion 1006 while skipping over the pixel locations of the first portion 1002. For example, a modified horizontal intra-prediction mode similar to that shown in FIG. 9B could be implemented by setting the prediction block pixels f, g, and h to the value of peripheral pixel J, and setting the prediction block pixels j, k, and l to the value of pixel K, and setting the prediction block pixels n, o, and p to the value of pixel L. The other intra-prediction modes of FIGS. 9B-9H could be similarly modified.

In another technique, determining the intra-predicted pixel values can comprise generating the intra-predicted pixel values using at least some of the pixel values of the inter-predicted pixel values. In FIG. 10, for example, a modified horizontal intra-prediction mode similar to that shown in FIG. 9B could be implemented by setting the prediction block pixels f, g, and h to the value of inter-predicted pixel I1, setting the prediction block pixels j, k, and l to the value of inter-predicted pixel J1, and setting the prediction block pixels n, o, and p to the value of inter-predicted pixel K1. In this way, a prediction block of pixel values for a current block in a current frame may be determined using intra-prediction of pixel values from a first reference frame, where the pixel values from the first reference frame are determined using inter-prediction based on the template. The other intra-prediction modes of FIGS. 9B-9H could be similarly modified.

In other examples, intra-prediction modes not previously available may be used. Conventionally, intra-prediction modes use those pixels above and to the left of the current block to determine the prediction block because those are the only pixels that have already been encoded and decoded at the time of predicting the current block. However, because the first portion of a prediction block herein uses pixels values from an encoded and decoded reference frame, various shapes of the templates permit intra-prediction to be performed in directions and manners not available in existing intra-prediction modes. For example, the use of the template 702 of FIG. 7A to determine the inter-predicted pixel values for the first portion of a prediction block would provide encoded and decoded pixels on all four sides of a 4×4 prediction block—pixels from neighboring blocks above and to the left, and the inter-predicted pixels to the right and the bottom of the prediction block. All of these pixels are available in different horizontal, vertical, diagonal, or single-value intra-prediction modes. In one example, a horizontal intra-prediction mode is available that propagates pixel values from the inter-predicted pixels on the right, and in another example, a vertical intra-prediction mode is available that propagates pixel values from the inter-predicted pixels on the bottom.

Further, pixels from neighboring blocks to the current block may be used together with the inter-predicted pixels in some intra-prediction modes.

Referring again to FIG. 6, the current block is encoded or decoded using the prediction block. Encoding the current block using the prediction block at 608 can include determining a residual for the current block, and encoding the residual into an encoded bitstream with information necessary for decoding the current block. For example, the encoding process could include processing the residual using the transform stage 404, the quantization stage 406, and the entropy encoding stage 408 as described with respect to FIG. 4. The information necessary for decoding the current block may include a mode indicator (sometimes called a flag) that indicates that the current block was encoded using a template, an indicator of the template, the motion vector(s) found as a result of the motion search(es), the identification of the reference frame(s), and an indicator of which intra-prediction mode was used to determine the second portion of the prediction block. The information may be included in frame, slice, segment, or block headers, and not all of the information need be transmitted in the same header. Moreover, not all information need be transmitted. If the decoder can perform a test on the data to select a decoding mode without transmitting bits, bandwidth can be saved. Other modifications are possible.

Decoding the current block using the prediction block at 608 includes decoding the residual for the current block from the bitstream, and adding the prediction block to the residual. For example, the decoding process could include processing the residual using the entropy decoding stage 502, the dequantization stage 504, and the inverse transform stage 506 as described with respect to FIG. 5. Then, the current block could be reconstructed at reconstruction stage 510 as also described with respect to FIG. 5.

Determining prediction blocks using combined inter- and intra-prediction as described herein may permit blocks of a frame to be predicted with improved accuracy over using either inter- or intra-prediction alone. This permits video frames to be encoded and transmitted using fewer bits, thereby decreasing bandwidth requirements, a desirable result.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example," "embodiment" or "aspect" is used herein to mean serving as an example, instance, or illustration. Any aspect or design described herein using these words is not necessarily to be construed as preferred or advantageous over other aspects or designs. Rather, use of these words is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms and/or instructions described herein. In addition or alternatively, for example, a special purpose computer/processor can be utilized that contains other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server and the receiving station 106 can be implemented on a device separate from the server, such as a hand-held communications device. In this instance, the transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device and/or a device including an encoder 400 may also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video signal using a computing device, the video signal including frames defining a video sequence, the method comprising:
    partitioning a frame into a plurality of blocks, each of the plurality of blocks having pixels;
    determining a template for prediction of a current block of the plurality of blocks, the template having a pattern of contiguous pixel locations corresponding to a proper subset of pixel positions of the current block, and the template determined from a plurality of pre-defined templates, each of the pre-defined templates comprising a respective pattern of pixel locations;
    determining inter-predicted pixel values for a first portion of a prediction block using the template, the first portion corresponding to the pattern of the template;
    determining intra-predicted pixel values for a remaining portion of the prediction block, wherein determining the intra-predicted pixel values comprises generating the intra-predicted pixel values using at least some of the inter-predicted pixel values; and
    encoding the current block using the prediction block.

2. The method of claim 1, wherein each of the plurality of pre-defined templates has at least one column with a number of pixel locations equal to a first dimension of the current block, and has at least one row with a number of pixel locations equal to a second dimension of the current block.

3. The method of claim 2, wherein the first portion of the prediction block comprises a single column and a single row sharing a corner, and wherein the corner of the prediction block is a lower right-hand corner, an upper left-hand corner, or a lower left-hand corner of the prediction block.

4. The method of claim 1, wherein the first portion of the prediction block has at least one column and at least one row with a common originating pixel location in corner of the prediction block.

5. The method of claim 4, wherein determining the intra-predicted pixel values comprises performing intra-prediction using one of a plurality of intra-prediction modes that includes a horizontal prediction mode, a vertical prediction mode, diagonal prediction mode, or a single-value prediction mode.

6. The method of claim 5, wherein performing the intra-prediction comprises applying the one of the plurality of intra-prediction modes to at least one of the inter-predicted pixel values.

7. The method of claim 1, wherein determining the template comprises selecting the template from the plurality of pre-defined templates using rate/distortion measures.

8. The method of claim 7, further comprising:
    encoding an identifier for the template, a motion vector used in determining the inter-predicted pixel values for the first portion of the prediction block, and an identifier for an intra-prediction mode used in determining the intra-predicted pixel values for the remaining portion of the prediction block into an encoded bitstream for use in a decoder.

9. A method for decoding a video signal in an encoded bitstream using a computing device, the video signal including frames defining a video sequence, the method comprising:
    determining a template with pixel locations that correspond to a proper subset of contiguous pixel locations of a current block, the template determined from a plurality of pre-defined templates, each of the pre-defined templates comprising a respective pattern of pixel locations;
    determining a prediction block of pixel values for the current block, the current block resulting from partitioning a current frame into a plurality of blocks having pixels, using inter-prediction of pixel values from a first reference frame, wherein the pixel values from the first reference frame are determined in a first portion using inter-prediction based on the pixel locations of the template, and wherein remaining pixel locations of the prediction block include pixel values determined using intra-prediction and using at least some of the inter-predicted pixel values; and decoding the current block using the prediction block.

10. The method of claim 9, further comprising:

determining second pixel values from a second reference frame using inter-prediction based on the template; and combining the pixel values from the first reference frame with the second pixel values from the second reference frame to generate combined pixel values, wherein intra-prediction of the pixel values from the first reference frame comprises intra-prediction of the combined pixel values.

11. The method of claim 10, further comprising:

receiving, from an encoder, an identifier for the one of the plurality of pre-defined templates, a motion vector used in the inter-prediction, and an identifier for an intra-prediction mode of the intra-prediction in the encoded bitstream.

12. The method of claim 9, wherein the first portion comprises a single row and a single column having a common originating pixel location in a corner of the prediction block.

13. The method of claim 12, wherein the prediction block has dimensions of 4×4, and wherein the corner of the prediction block is a lower right-hand corner, an upper left-hand corner, or a lower left-hand corner of the prediction block.

14. An apparatus for decoding a video signal in an encoded bitstream, the video signal including frames defining a video sequence, the apparatus comprising:

a processor; and a non-transitory memory that stores includes instructions causing the processor to perform a method including:

determining pixel values of a first portion of a prediction block for a current block using inter-prediction and a template having a pattern of contiguous pixel locations corresponding to a proper subset of pixel locations of the current block such that the first portion corresponds to the pattern of the template, the current block resulting from partitioning a frame into a plurality of blocks, each of the plurality of blocks having pixels, and the template being one of a plurality of pre-defined templates, each of the pre-defined templates comprising a respective pattern of pixel locations;

determining pixel values of a remaining portion of the prediction block using intra-prediction using at least one pixel of the pixel values of the first portion; and decoding the current block using the prediction block.

15. The apparatus of claim 14, wherein determining the intra-predicted pixel values comprises generating the intra-predicted pixel values using the at least some of the inter-predicted pixel values and at least some pixels adjacent to the current block.

16. The apparatus of claim 14, wherein the instructions further cause the processor to perform a method including:

determining the template from the plurality of pre-defined templates by decoding an identifier of the template from the encoded bitstream received from an encoder.

17. The apparatus of claim 14, wherein the instructions further cause the processor to perform a method including:

determining the pixel values of the remaining portion of the prediction block using intra-prediction by generating the pixel values of the remaining portion using an intra-prediction mode of a plurality of intra-prediction modes.

18. The apparatus of claim 17, wherein determining the pixel values of the first portion comprises determining the pixel values of the first portion using one or more frames occurring before a current frame in the video sequence that includes the current block and one or more frames occurring after the current frame.

19. The apparatus of claim 17, wherein the at least one pixel value of the first portion comprises at least one of pixel values of a row of the first portion or pixel values of a column of the first portion.

20. The apparatus of claim 14, wherein the template comprises at least two different dimensions for each of a length and a width such that the template is other than a rectangular shape.

* * * * *